June 15, 1965 F. LYMAN, JR 3,189,672
METHOD OF MAKING AN INSULATING MOUNT WITH A TERMINAL
Filed Dec. 15, 1959 2 Sheets-Sheet 2
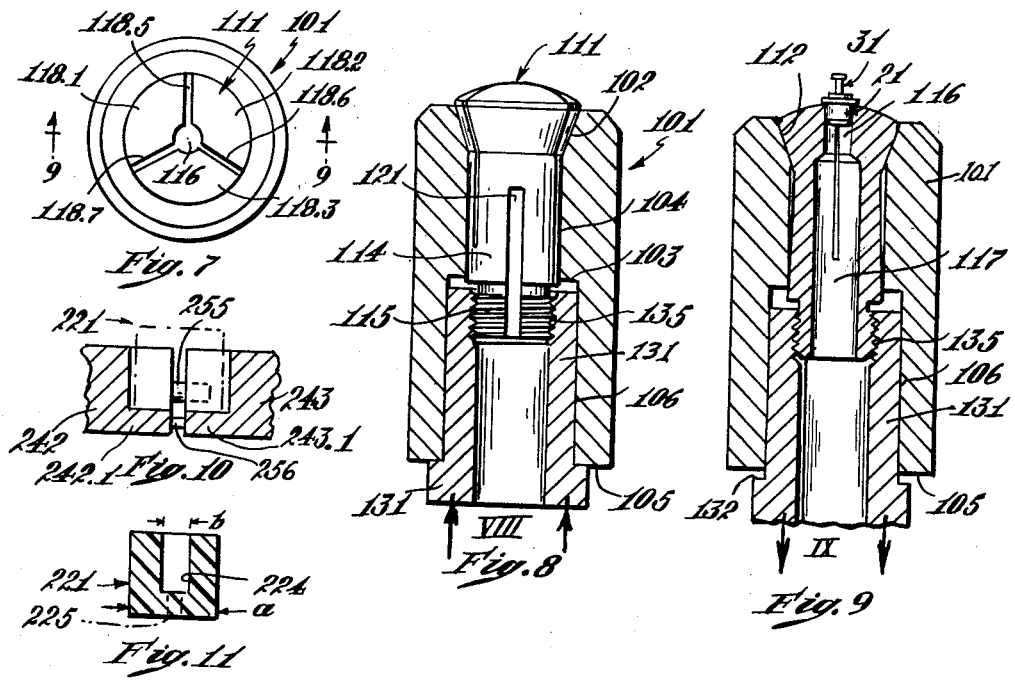
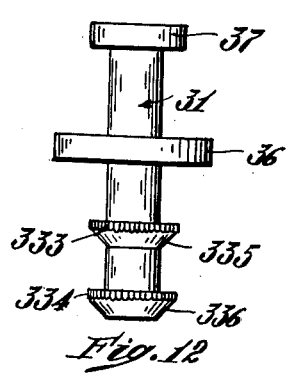
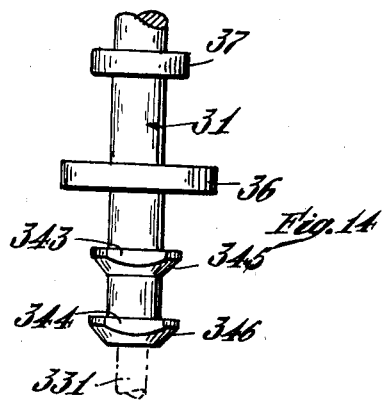
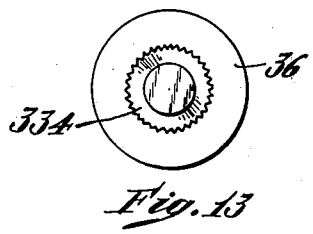
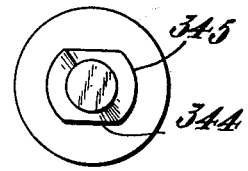
INVENTOR.
Frank Lyman, Jr.
BY Roberts, Cushman & Grover
ATTYS.

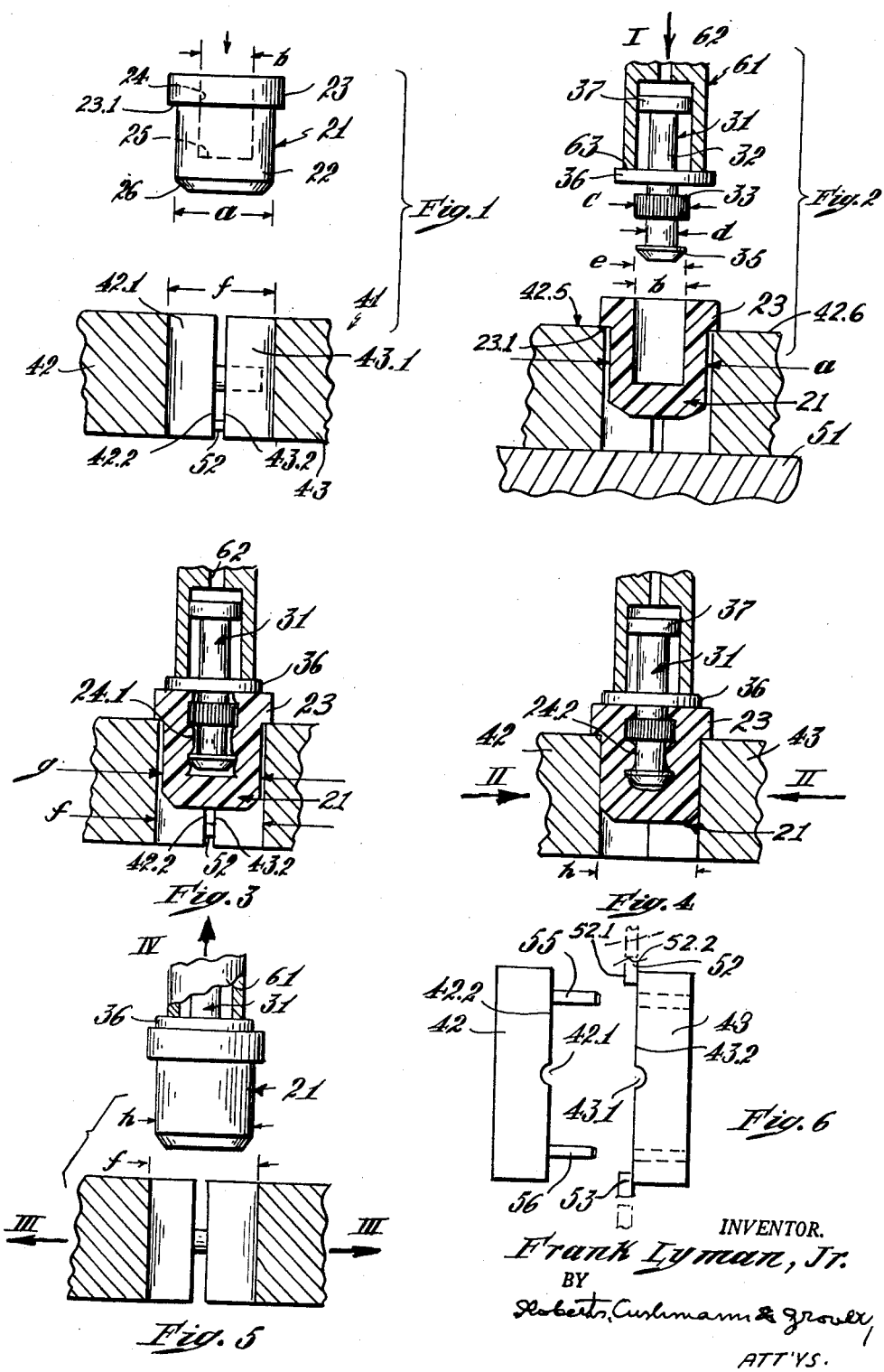

United States Patent Office 3,189,672
Patented June 15, 1965

3,189,672
METHOD OF MAKING AN INSULATING MOUNT WITH A TERMINAL
Frank Lyman, Jr., Cambridge, Mass., assignor to Cambridge Thermionic Corporation, Cambridge, Mass., a corporation of Massachusetts
Filed Dec. 15, 1959, Ser. No. 859,726
3 Claims. (Cl. 264—249)

The field of the present invention relates to the manufacture of composite articles such as mounts for use in electrical installations involving plastic insulating bodies with metallic inserts.

It has heretofore been proposed to manufacture articles of the above type involving metallic conducting or connecting means surrounded by insulating means, by pressing the metal part into a cavity pre-formed in the insulating means, but the finished articles obtained by such conventional methods are not always fully satisfactory because the final shape cannot be exactly controlled if the insulating material is of the electrically and mechanically superior type exemplified by polyfluoroethylene polymers which have little elastic memory or tendency to return to an original shape after having been more or less suddenly deformed or at least have a tendency to become permanently deformed under continuous stress below a certain pressure, while on the other hand they have a comparatively high tendency to flow upon application of higher pressures, due to low internal or molecular friction.

Such materials are ill suited for incorporation in conventionally designed and fabricated articles of the above type if fairly exact and permanently retained dimensions are specified, so that it was quite important to find commercially acceptable techniques which permit the permanently safe use of precisely dimensioned insulating circuit components incorporating these materials while taking full advantage of their above-mentioned superior characteristics.

Considerable improvement has been accomplished by restraining the insulator body to a desired pre-formed as well as final configuration, during assembly by inserting the metallic or otherwise rigid component, but this method of assembly does not necessarily lead to an optimally firm joining of insulating body and insert as well as to an accurately predictable final shape of the insulating body.

Objects of the present invention are to improve the above-outlined assembly technique for the purpose of obtaining composite articles of superior qualities with regard to the internal joining of the plastic insulating body and the rigid insert as well as with regard to precisely and permanently predictable shape and dimension of the insulating body; to provide for that purpose an optimally simple process which can be carried out by unskilled labor and is for its success independent of the operator's skill; to provide such a process which can be carried out by assembly apparatus capable of being actuated by easily available machinery, to provide such apparatus which is simple, inexpensive, rugged and adaptable to fully automatic operation; and to provide composite articles of the above type which are optimal as to quality of performance and accuracy and permanence of dimensional specifications.

The nature and substance of the present invention can be shortly summarized in its principal aspects and features as follows.

For the manufacture of composite articles such as insulating mounts with a rigid, such as metal component within a recessed body made of insulating material having physical properties characteristic of polyfluoroethylenes such as appreciable tendency to flow due to low internal friction and little tendency elastically to return to an original shape after deformation, the method according to the invention comprises the steps of inserting the rigid component into the recess of the insulating body while the outside of the latter is not constrained and free somewhat to expand through insertion of the rigid component, and by thereupon substantially uniformly compressing or coining the body containing the insert, such that the outside of the body is reduced to dimensions determined by the coining tool, such that the body is internally substantially closed about the insert, and such that the insulating material is molecularly conditioned essentially to retain its coined shape.

In an important aspect of the invention the insert and the insulating body are heteromorphically preformed such that the insert has one or more portions larger than the corresponding portions of the body recess which are provided for contacting these insert portions, and by preforming the insulating body to predetermined outside dimensions which are equal to or slightly greater than the corresponding desired finished dimensions and smaller than the open coining form dimensions of the tool which is used to give the article its final shape after the insertion of the insert into the unrestrained body. In a similar aspect, the new technique contemplates a predetermined correlation between the dimensions of the insert, the insulating body recess and the insulating body outside, such that the recess of the body is initially somewhat smaller than the outside diameter of that portion of the insert which is engaged by the insulating body, and such that the outside of the insulating body is initially smaller than the dimensions of the coining form which first loosely supports or locates the insulating body but thereupon closes in for coining the body to finished outside dimensions equal to or smaller than the initial, preformed body dimensions.

In a further aspect, the invention is concerned with a device for making composite articles by the process characterized above, comprising split coining form means having a plurality of portions defining when closed a predetermined form recess surface, means for separating these portions of the coining form means such as to accommodate without restraint within the form recess surface the preformed insulating body, and means for closing the coining form portions after the insert has been pressed into the insulating body previously placed into the open form, such that the body is coined to exact predetermined outside dimensions and the insulating body is closed within its recess and shaped around the insert.

In the aspect of the final article produced by way of the above characterized process with the likewise above characterized apparatus, the invention concerns a composite article comprising a rigid such as metallic insert with an anchoring portion and a conductor portion of smaller dimensions, within an insulating body of polymer material having the above outlined physical properties characteristic of polyfluoroethylenes, the body being essentially wholly closed about the metal insert, the outside of the insulating body being coined to predetermined dimensions, and the polymer material of the insulating body being in its molecular structure conditioned, by coining, to preserve the configuration imparted thereto by such coining better than by merely confining the insulating body during the insertion of the insert.

These and other objects and aspects of the nature of the invention will appear from the herein presented outline of its principles, its mode of operation and its practical possibilities together with a description of several typical embodiments illustrating its novel characteristics.

The description refers to drawings in which—

FIGS. 1 to 5 are schematical views, mainly in cross section but partly in elevation, illustrating the process according to the invention, also illustrating the components of the article made according to this process in various stages thereof, and further illustrating one embodiment of apparatus suitable for carrying out this process;

FIG. 6 is a top view of the supporting and coining die schematically shown in FIGS. 1 to 5;

FIG. 7 is a top elevation of a second embodiment of apparatus suitable for carrying out the invention;

FIG. 8 is a sectional view of the apparatus according to FIG. 7, with the collet portion in elevation and the sleeve portions in axial section;

FIG. 9 is a section on lines 9—9 of FIG. 7;

FIG. 10 is a schematical axial section through a modification of the coining die according to FIGS. 1 to 6, with a bottom for accommodating an insulating body according to FIG. 11;

FIG. 11 is a sectional view of a modification of the insulating body, different from that shown in FIGS. 1 to 5, for use with bottom closed coining dies according to FIG. 10;

FIG. 12 is an elevation of a modified metal insert, according to one aspect of the invention, differing from the insert shown in FIGS. 1 to 5;

FIG. 13 is a bottom view of the insert according to FIG. 12;

FIG. 14 is the elevation of still another embodiment of an insert suitable for purposes of the invention; and FIG. 15 is a bottom view of the insert according to FIG. 14.

The components used in the process according to the invention will first be described with reference to FIGS. 1 to 5. These components consist in this embodiment of a plastic insulator body 21 (FIG. 1) and a metal insert pin 31 (FIG. 2).

The insulator body 21 comprises prior to assembly a cylindrical body portion 22, a flange 23 with a transverse portion 23.1 and a cylindrical recess 24 having a bottom 25. The insulator body can be chamfered as indicated at 26. The outside diameter $a$ of the cylindrical portion 22 and the diameter $b$ of the cylindrical recess 24 are indicated in FIGS. 1 and 2 and will be again referred to with reference to a characteristic feature of the invention.

The insulator body 21 is made of synthetic polymer material of the peculiar type for which, as mentioned above, the hereindescribed technique is especially suited. Such material comprises certain compounds of the polyethylene and especially of the polyfluoroethylene type which have particularly favorable electrical and mechanical properties, for example polyethylene, polychlorotrifluoroethylene and polytetrafluoroethylene resins commerically available under the trade names Alathon, Kel-F, and Teflon, respectively. These materials exhibit properties which make them unsuitable for conventional assembly with metal or otherwise rigid components. They are non-adhesive, inelastic in the sense that they are of comparatively low viscosity in the sense that they have little internal friction so that they are easily deformable and have a tendency to flow around obstructing surfaces, especially if induced to do so by way of sudden rather than gradual impact. The present invention utilizes these characteristics for the purposes of the pressurable assembly and coining technique to be described below, while avoiding their possibly detrimental effects. It was also found that this technique imparts to the insulator body a molecular structure which favors retention of shape and size even during use at elevated temperatures. It will be noted that the term "coining" is conventionally understood to mean a cold metal-working process in a press-type die, compare for example Knight's Mechanical Dictionary, 1877, volume 1, page 591, or McGraw-Hill Encyclopedia of Science and Technology, volume 3, page 270. The term is herein used in this conventional sense, although applied to the cold working of a synthetic material.

The insulating body component can be modified according to different purposes at hand and one such modification will be described by way of example hereinbelow with reference to FIG. 11. Such modifications require corresponding modification of the assembly tool such as will be likewise described below by way of example, with reference to FIG. 10.

The metal insert 31 has a pin or stud portion 32 upon which are superimposed constraining portions for preventing axial as well as rotatory movement within the insulating body portion, such as the knurled collar 33, and the chamfered anchor 35. It will be noted that the insert and the body recess 24 are heteromorphic. Extending at the other side of the pin are portions serving the electrical purpose of the device such as a flange 36 and a soldering stud or lug 37. It will be understood that any suitable terminal structure or connecting means such as for example a jack or pin portion, can be used instead of lug elements. It should further be understood that the constraining portions such as 33 and 35 can have different shapes suitable for the general functional purpose; by way of example such modifications will be described hereinbelow with reference to FIGS. 12 to 15.

The preassembly dimensions $c$, $d$ and $e$ of the conducting insert 31 indicated in FIG. 2 are significant in the context of the present invention as will be described in detail hereinbelow.

Apparatus for carrying out the technique according to the invention will next be described. FIGS. 1 to 5 show such apparatus, having a coining or compressing die 41 consisting, as also shown in FIG. 6, of segments such as two halves 42 and 43 with semi-cylindrical recesses 42.1 and 43.1 and matching flat surfaces 42.2 and 43.2. The die halves are suitably supported such as sliding on a plate or table element 51 (FIG. 2). The die segments can be brought into close contact at the faces 42.2 and 43.2, or they can be maintained at a predetermined distance such as by means of the spacers 52 and 53 each having stop or distancing faces 52.1, 52.2 which in FIG. 6 are shown in service position for the purpose of spacing the die halves and also, with dotted lines, in inoperative, withdrawn position. Suitable means such as pins 55 and 56 serve to maintain proper register between the portions 42.1 and 43.1 during the assembly. The spacers 52 and 53 define the opening $f$ of the die halves 42 and 43, as indicated in FIGS. 1, 3 and 5, whereas the diameter of the closed die recess is $h$ as indicated in FIG. 4.

The process according to the invention, as applied to the above described components of the composite article by means of the above described apparatus, is carried out as follows.

By suitable conventional feeding means, or by hand, the insulator body 21 is placed into the recess of the coining die, such that it is retained therein by means of the flange 23, as shown in FIG. 2, the transverse portion 23.1 of the flange of the body resting on the supporting faces 42.5, 42.6 of the die 41.

Either by hand or by conventional inserting means such as a pneumatic holder 61 with air port 62, the insert 31 is then pressed into the body 21 as indicated by arrow I of FIG. 2, the initial position being shown in FIG. 2 and the final position being shown in FIG. 3.

The spacers 52 and 53 are now withdrawn and the coining dies forcibly moved toward each other thus coining or compressing the plastic insulator body 21 as indicated at II of FIG. 4. The insulator body now assumes the outside dimension $h$ and its recess closes firmly around the insert, as indicated by the contour 24.2 in FIG. 4.

As mentioned above, the constraining portions of the metal insert are somewhat larger than the initial recess of the insulating body so as to provide some expansion of the latter upon insertion of the former. For example the hole of the Teflon insulator in a typical embodiment has a diameter $b$ of .059±.001 inch. The diameter $e$ of the anchor 35 is .071±.001 inch, the diameter $c$ of the knurled part 33 is .073±.003 inch, and the diameter $d$ of the shank is 0.05±.001 inch. The outside diameter

*a* of the insulator body, is initially .151±.001 inch and the initial die opening *f* is approximately .160 to .169 inch. The forcible insertion of the metal part 31 into the plastic body 21 somewhat expands the latter so that it assumes a dimension indicated at *g*, of approximately .155 to .159 inch which, it will be noted, is smaller than the above *f* dimension namely .160 to .169, so that the body with the insert could be easily drawn from the not yet fully closed die. As indicated in FIG. 3, the walls of the recess 24 will somewhat bulge at its insert as indicated at 24.1. It was found that this deformation is in most instances not sufficient to secure a firm connection between the insulator body and the insert.

In many instances it will be satisfactory to make the dimensions *a* and *h* equal but this is by no means a necessary condition; for example if the difference between diameters *b* and *d* is considerable, then the dimension *h* could be substantially decreased.

The composite article having now attained its final form, the die heads 42 and 43 are separated as indicated by arrows III of FIG. 5, preferably but not necessarily to the initial distance *f* (FIGS. 1 and 5), and the finished article is withdrawn in the direction of the arrow IV, as indicated in FIG. 5. The spacers 52, 53 or similar means are again brought into action, and the device is ready for the next cycle of operation.

The insert holding and moving device 61 can have the shape of a simple cup with a transverse face 63 fitting the flange 36 or a similar portion of the insert so that, if the air is evacuated at 62, the insert will be held within the cup while, if the vacuum is released and air blown in at 62, the composite article can be ejected.

As mentioned above, the forcible insertion of the insert 31 somewhat widens the insulator body during the insertion step according to FIG. 3 so that it assumes the dimension *g* whereas the subsequent coining to dimension *h* according to FIGS. 4, and 5 squeezes the Teflon fully into the neck between the knurled portion 33 and the anchor 35 such as to increase the resistance against being pulled apart. The coining also squeezes the Teflon into the groove of the knurled metal portion so as to increase the resistance against relative rotation between the two parts.

Care must be taken that the coining form is not closed while the metal component 31 is being inserted (FIG. 3) into the insulating body resting on its shoulder 23, since this would contact the central hole of the insulator, causing the metal to shave and damage the insulator; this would diminish the resistance against pulling out.

There is so far as could be determined, no "spring back," elastic return, or expansion from dimension *h* of the insulator subsequently to the step according to FIG. 4; if it occurs at all it would be less than approximately .001 inch.

No specific setting time between the steps FIG. 4 and FIG. 5 is required; for practical purposes one second is sufficient which is approximately the time required to close and to open the coining form 41.

So far as could be determined since the introduction of this technique, coining imparts a permanent shape and size to the insulator body. While it was not possible to check results under very long term storage conditions particularly at elevated temperatures such as 125° F. or higher, little or no change is expected in view of simulated permanency tests that have been made.

The coining form according to FIGS. 1 to 6, while satisfactory for many purposes, is not theoretically perfect because the coining force does not act nearly radially at all angles so that a somewhat heterogeneous molecular structure of the coined plastic might result. The embodiment now to be described with reference to FIGS. 7 to 9 is superior in this respect.

In FIGS. 7 to 9 a tubular holding sleeve 101 is provided with a conical compression face 102, with a movement limiting shoulder or face 103 and therebetween with a cylindrical bore 104. The face 105, transverse to the axis of the recess 24 of the body 21, at the end of the widened sleeve portion 106 has a purpose to be described hereinbelow. The coining form proper is indicated at 111. It has a conical portion 112 corresponding to the inner surface 102 of the sleeve 101, and a cylindrical shank 114 with a threaded portion 115 of reduced diameter. Key means 121 prevent the coining form 111 from rotating within the holder 101. The coining form is hollow on the inside as indicated at 116 and 117 of FIG. 9, and it has a number, for example three sectors 118.1, 118.2 and 118.3, separated by slits 118.5, 118.6, 118.7. These slits permit contraction of the coining cavity 116, with the conical surfaces 102 and 112 sliding on each other if the coining form 111 is drawn downwardly such as by means of an actuating rod or tube 131 having a stop face 132 which limits the movement in the other direction by way of contact with the above mentioned face 105 of sleeve 101 which is parallel to face 132 and shoulder 103 and constitutes a second stop face. The coining form 111 and the actuating member 131 are joined by suitable means such as threads 135.

It will now be evident that movement of the actuating member 131 upwardly in the direction of arrows VIII will open the coining form as indicated in FIGS. 7 and 8, whereas downward drawing of 131 will close the coining form as indicated at IX in FIG. 9 which also shows the composite article made up of insulating body 21 and metal insert 31. In other words, the stop faces 105, 132, and the slits 118.5/6/7 represent stop means which positively predetermine and alternately establish the dimensions which loosely accommodate, and then mold, the insulator body. It will be evident that the respectively opposite faces of slits 118.5, 118.6, 118.7 constitute stop means for positively predetermining and establishing the molding surface dimensions of the form means, when full in contact, as shown by the converging contours of the lower slit portion shown in the center of FIG. 9. It will also be evident that the transverse face 105 of the form sleeve or holder 101 and the transverse face 132 or the form stem 131 together constitute stop means for positively predetermining and establishing by contact thereof the dimensions for accommodating the body 21 before it is compressed. These two dimensions can be established alternately and precisely simply by relatively shifting parts 101 and 131 as herein described. The operation of this tool for carrying out the process of the invention is otherwise the same as described with reference to FIGS. 1 to 6.

As mentioned above, the shape of the insulating body is not critical and instead of using a flange 23 according to FIGS. 1 to 5 for supporting the insulating polymer body during the insertion of the rigid core, it may rest on its bottom instead, such as indicated in FIGS. 10 and 11. In FIG. 10, the coining die parts 242 and 243 correspond to parts 42 and 43 of FIGS. 1 to 6, whereas the bottom portions 242.1 and 243.1 have been added in this embodiment. The guide pins 255 and 256 are of similar construction and have a similar function to those shown in FIG. 6. Distancers similar to those shown at 52 and 53 of FIG. 6 can be used, as described with reference to that figure.

FIGS. 10 and 11 indicate an insulating body 221 which is quite similar to that described above labeled 21, with a recess 224 and outside and recess dimensions *a* and *b*, respectively, selected according to the same principles as above described.

It will be evident that the outside as well as recess configuration of the insulating body may deviate somewhat from the strictly cylindrical shape described above, so long as the herein outlined principles are adhered to.

As likewise mentioned above, the metal or otherwise rigid inserts can have various shapes suitable for the purpose at hand. Shapes which have been found particularly beneficial in addition to that shown in FIGS. 1 to 5 are illustrated in FIGS. 12 to 15 as follows.

In FIGS. 12 and 13, the shank and flange portions can be quite similar to those of FIGS. 1 and 5 and similar numerals have been applied thereto. However, instead of separate anchor and rotation preventing portions, this embodiment has one or two anchors as indicated at 335 and 336, with indented portions 333, 334. It was found that this construction very effectively prevents separation of the insulator body and insert in axial as well as transverse directions.

The embodiment according to FIGS. 14 and 15 differs from that according to FIGS. 12 and 13 in that the anchor portion or portions 345 and 346 have flat faces 343 and 344 which have the same function as the knurled portion 33 of FIGS. 2 to 4 and the indented portions 333 and 334 of FIGS. 12 and 13.

It will be evident that the inserts can be extended in both directions in which case the insulating bodies will be fully perforated, as indicated at 225 of FIG. 11 and 331 of FIG. 14.

It should be understood that the present disclosure is for the purpose of illustration only and that this invention includes all modifications and equivalents which fall within the scope of the appended claims.

I claim:

1. In manufacturing composite articles such as insulating mounts with a metal insert within a recessed body made of insulating material having physical properties characteristic of polyfluoroethylenes, the method which comprises the steps of:
   holding said body without essential restraint of its outer surface;
   forcibly placing said insert into said recess of said body while said body is unconstrained and free to be expanded by the insert placed therein;
   after said inserting temporarily pressing said body around said insert substantially uniformly by cold working, such that the outside dimension of the body is uniformly reduced and said body recess is substantially closed around said insert; and
   finally releasing the temporary pressure.

2. In manufacturing composite articles such as insulating mounts with a metal insert within a body with a recess and made of insulating material having physical properties characteristic of polyfluoroethylenes, the method which comprises the steps of:
   preforming said insert and said body such that the insert and the recess of the body are cylindrically heteromorphic and the insert has a peripheral portion which is larger than a peripheral portion of the body recess provided for said insert;
   forcibly placing said insert into said recess of said body while said body is unconstrained and free to be expanded by the insert placed therein;
   after said inserting temporarily pressing said body around said insert substantially uniformly by cold working such that the outside dimension of the body is uniformly reduced and said body recess is substantially closed around said insert; and
   finally releasing the temporary pressure.

3. In manufacturing composite articles such as insulating mounts with a metal insert within a recessed body made of insulating material having physical properties characteristic of polyfluoroethylenes, the method which comprises the steps of:
   preforming said insert and said body such that the insert and the recess of the body are cylindrically heteromorphic and the insert has a peripheral portion which is larger than a peripheral portion of the body recess provided for said insert;
   preforming said body to a predetermined outside dimension;
   forcibly placing said insert into said recess of said body while said body is unconstrained and free to be expanded by the insert placed therein;
   after said inserting temporarily compressing said body around said insert substantially uniformly by cold working such that said outside dimension of the body is uniformly reduced to said preformed outside dimension, and said body recess is substantially closed around said insert; and
   finally releasing the temporary pressure.

References Cited by the Examiner

UNITED STATES PATENTS

| 697,262 | 4/02 | Marcy | 18—42 |
| 1,161,888 | 11/15 | Robbins | 279—53 |
| 2,425,104 | 8/47 | Luce | 18—59 X |
| 2,517,043 | 8/50 | Smith et al. | 279—53 |
| 2,794,574 | 6/57 | McGeorge et al. | 222—92 |
| 2,918,521 | 12/59 | Abrams | 174—166 X |
| 2,931,008 | 3/60 | Abrams | 174—153 X |

FOREIGN PATENTS

| 132,164 | 3/33 | Austria. |
| 824,287 | 12/51 | Germany. |

JOHN F. BURNS, *Primary Examiner.*

W. A. WILTZ, RUDOLPH V. ROLINEC, BENNETT G. MILLER, E. J. SAX, JOHN P. WILDMAN, *Examiners.*